Aug. 17, 1937.  A. P. FERGUESON  2,089,952
SPARE TIRE COVER AND WHEEL HUB FITTING
Filed Nov. 16, 1933  4 Sheets-Sheet 2
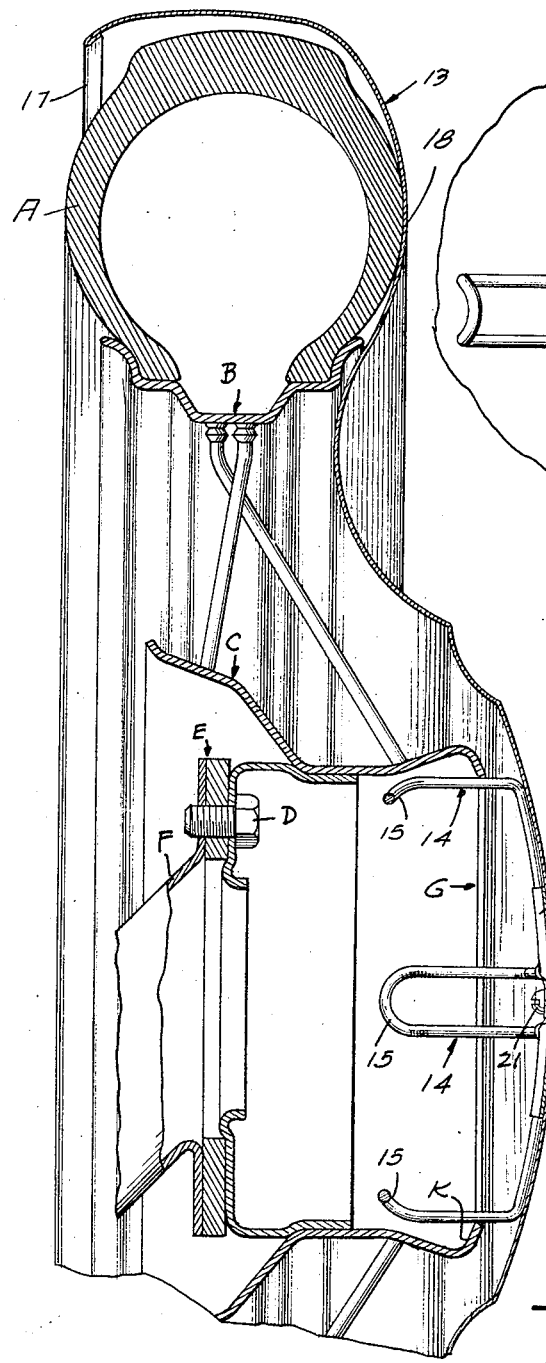
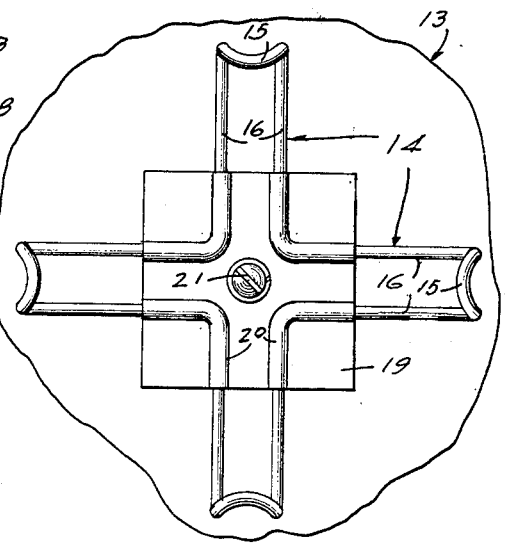
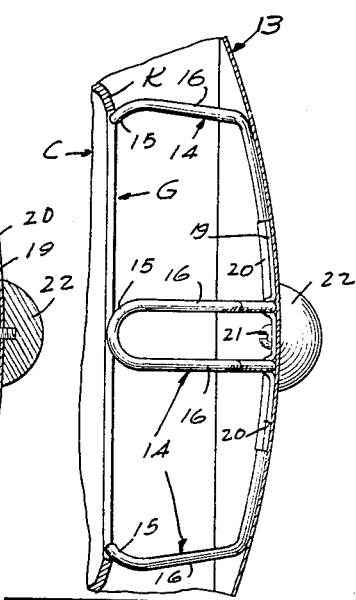
Inventor
ARTHUR P. FERGUESON.

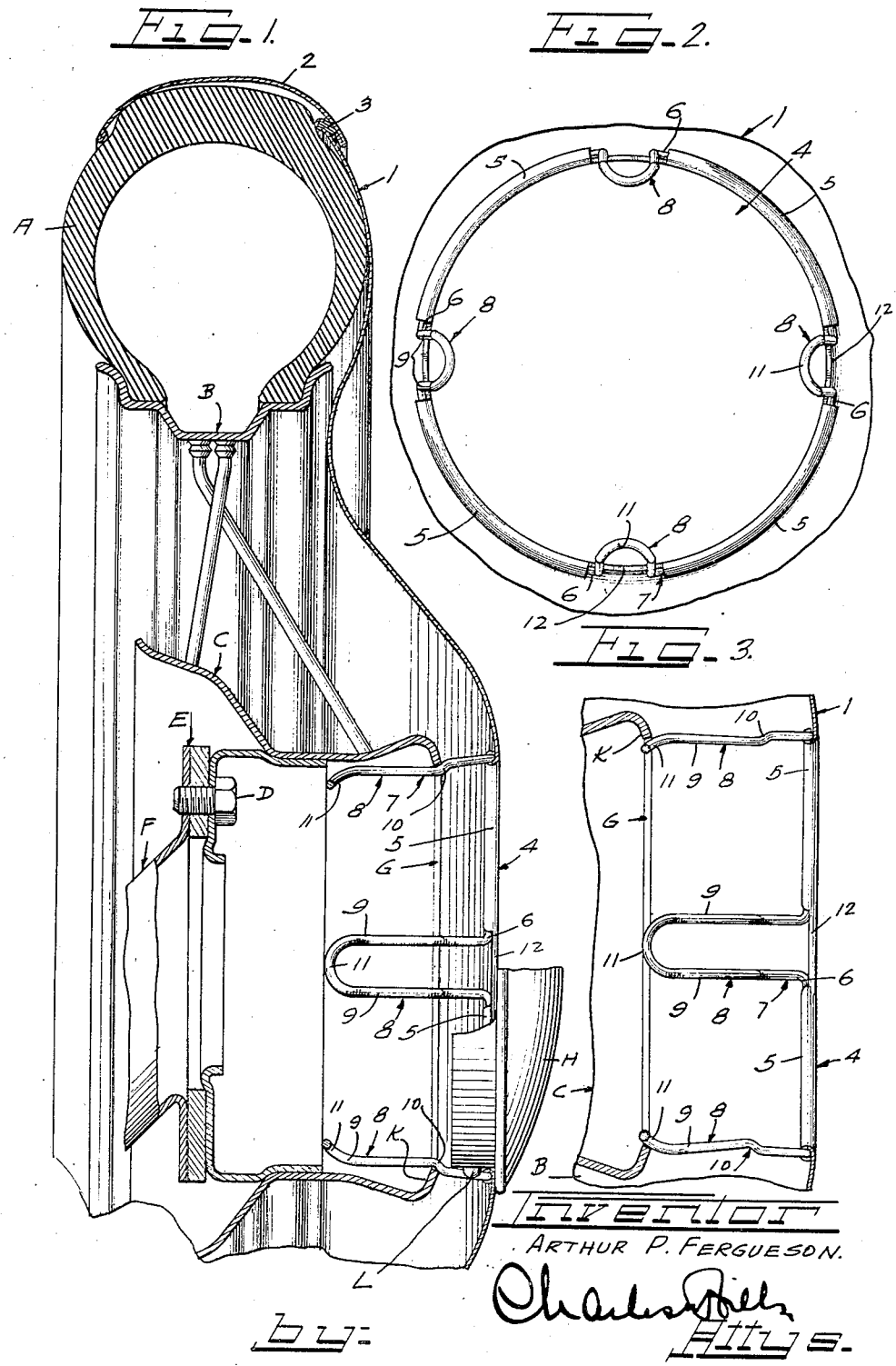

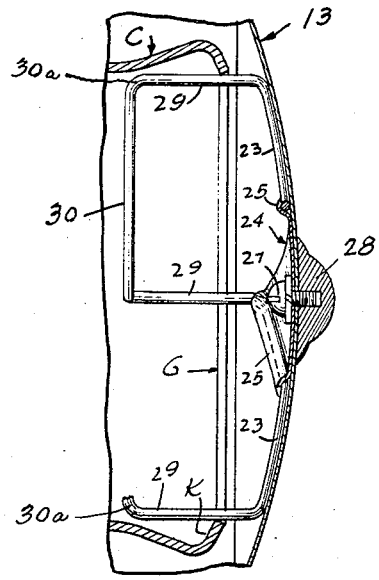
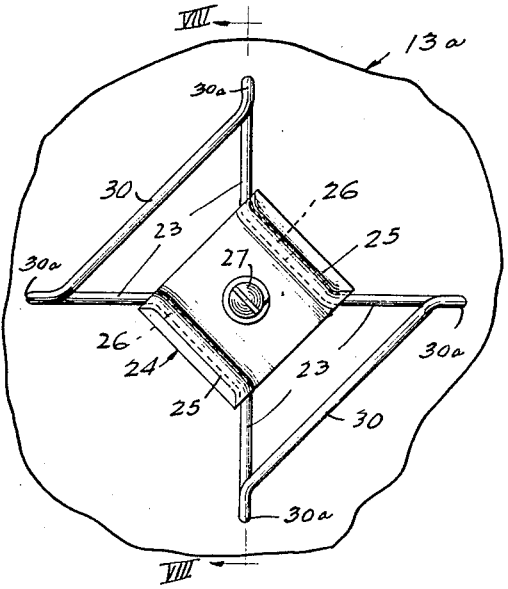
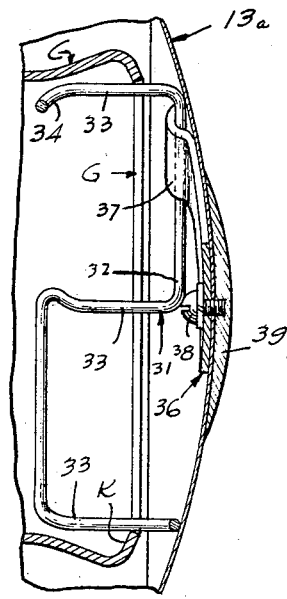
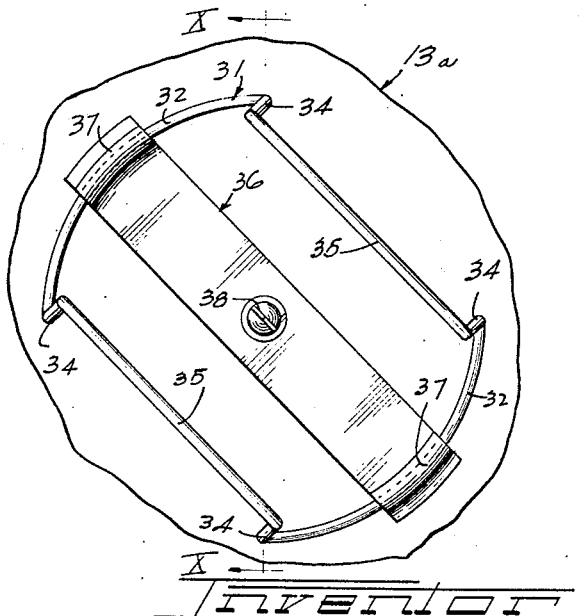

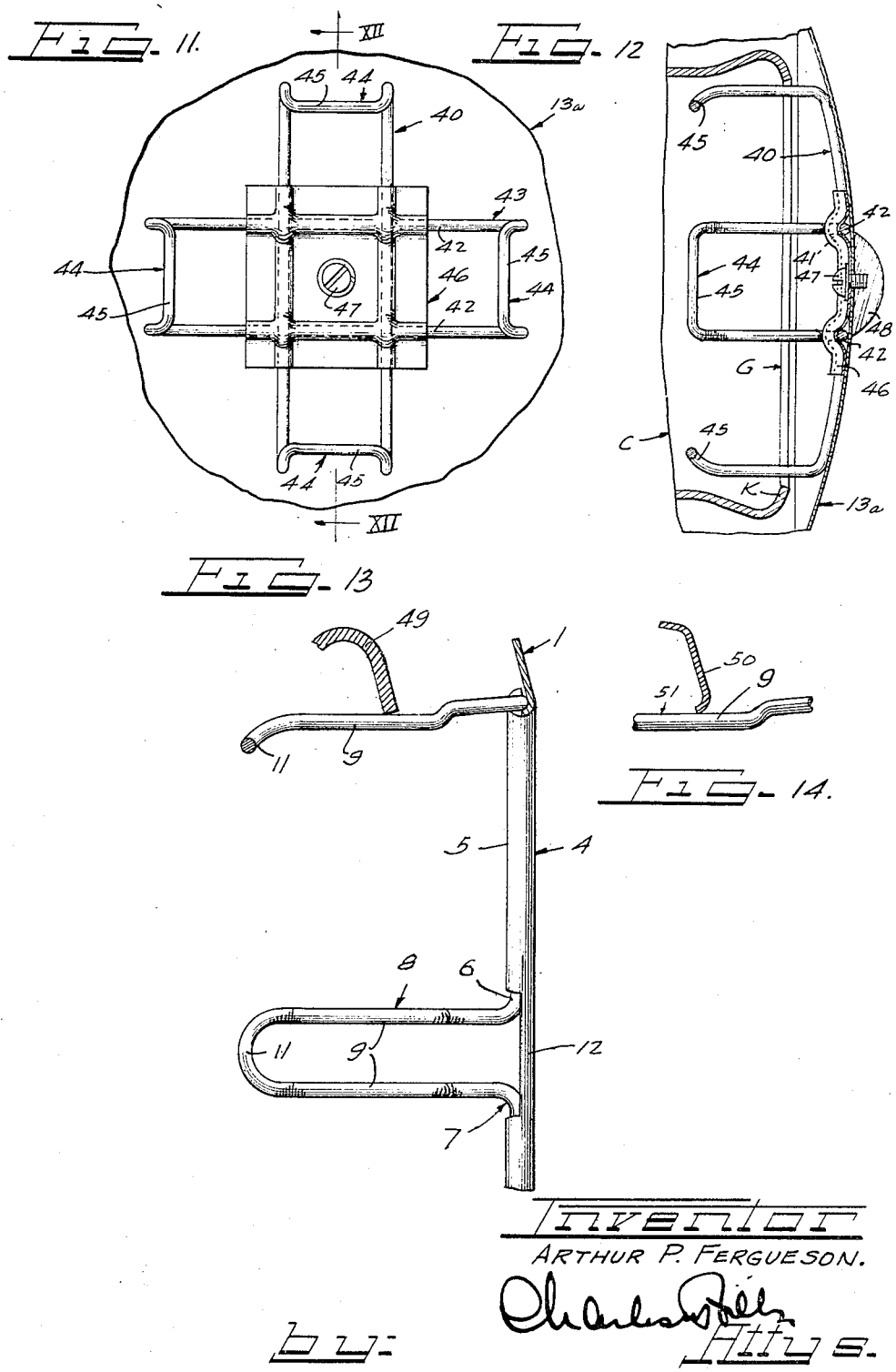

Patented Aug. 17, 1937

2,089,952

UNITED STATES PATENT OFFICE 2,089,952

SPARE TIRE COVER AND WHEEL HUB FITTING

Arthur P. Fergueson, Detroit, Mich., assignor to Lyon Cover Company, Detroit, Mich., a corporation of Michigan Application November 16, 1933, Serial No. 698,260

20 Claims. (Cl. 150—54)

This invention has to do with tire covers, and is concerned more particularly with spare wheel hub fittings therefor.

It is an object of the invention to provide simple and effective means for readily centering a tire cover on a spare wheel and tire.

It is another object of the invention to provide resilient centering means in conjunction with a tire cover so as to not only center the cover but prevent rattling between the same and the wheel while so centered.

It is a further object of the invention to provide centering means embodying a provision whereby the extent to which the centering means projects into the wheel is limited.

It is also an object of the invention to provide a tire cover with centering means enabling the cover to be centered with respect to disc or artillery type wheels as well as wire and other wheels.

It is a further object of the invention to provide means for supporting a cover centering means on one side of the cover and at the same time an ornamental device on the outside of the cover.

In accordance with the general features of the invention, there is provided a spring structure made of any suitable material such as spring wire secured to the inner side of the central portion of a drum-like side plate of a tire cover, the spring being formed with portions extending rearwardly of the cover at a radius slightly greater than the radius of the front opening of the spare wheel hub, and having their rearmost portions bent inwardly to provide cams. Upon engagement of the cams with the mouth of the front opening in the hub as the cover is pushed rearwardly toward the spare wheel and tire, said cams are forced inwardly by the mouth of the hub, and when the cover is in its final position, the spring resiliently presses outwardly upon the mouth of the hub opening, thereby centering the cover and at the same time preventing rattling between the cover and the wheel.

The invention may be embodied in a plurality of spring shapes which may be fastened by a plate engaging the same and a screw passing through the plate and cover. If desired, an ornamental knob or plate may be secured to the fastening member on the front side of the cover.

The spring may be continuous or split, and in whatever form the same is made, it will appear as the description proceeds that it is extremely simple, may be secured in place very readily, may be constructed at a very low cost of manufacture, may be designed for covers to which the hub caps may be attached as well as to those which extend entirely across the front of the hub, and is durable.

Other objects and advantages of the invention will appear as the description proceeds.

This invention (in preferred forms) is illustrated in the drawings and hereinafter more fully described.

Figure 1 is a fragmentary sectional view showing one form of the invention and one form of tire cover construction which may be employed in conjunction therewith.

Figure 2 is a fragmentary rear elevational view of the centering means and associated structure of Figure 1.

Figure 3 is a fragmentary sectional view similar to a part of Figure 1 but showing the position of the centering means just prior to insertion in the hub.

Figure 4 is a view similar to Figure 1 but showing a modified form of the invention.

Figure 5 is a fragmentary rear elevational view of the centering means and associated structure of Figure 4.

Figure 6 is a fragmentary sectional view of the centering means and associated structure as shown in Figure 4, with the centering means positioned prior to its insertion into the wheel hub.

Figure 7 is a fragmentary rear elevational view of a further modified form of the invention.

Figure 8 is a fragmentary sectional view taken substantially in the plane designated by the line VIII—VIII in Figure 7, certain parts being shown for convenience in elevation.

Figure 9 is a view similar to Figure 7 but of a still further modified form of the invention.

Figure 10 is a fragmentary sectional view taken substantially in the plane designated by the line X—X in Figure 9, certain parts being shown for convenience in elevation.

Figure 11 is a view similar to Figure 9 but shows another form of the invention.

Figure 12 is a fragmentary sectional view taken substantially in the plane designated by the line XII—XII in Figure 11, certain parts being shown for convenience in elevation.

Figure 13 is a fragmentary sectional view showing the position which the hub of a smaller wheel than that shown in the previous figures occupies in relation to the centering means, when the cover is properly mounted.

Figure 14 shows the position occupied by the hub of an artillery type wheel of substantially the same size as the wheel depicted in Figure 1, in relation to the centering means of Figure 1.

Referring now more particularly to the drawings, wherein like parts are designated substantially throughout by like reference characters, a spare tire A is mounted on a spare wheel B provided with a hub C which is removably mounted by means of bolts D to the flange structure E of a spare wheel carrier F, the latter preferably connected to the automobile frame, either at the rear or at a side, and either in conjunction with or independently of a well such as a fender well. The hub C has a front opening G to receive a hub cap H for releasable interlocking with the front wall K of the hub C.

The tire cover shown in Figure 1 comprises a drum-like side plate 1 having a substantially central opening for releasable interlocking engagement with the wheel hub C, and is held in hugging engagement with the tire by a split arcuate resilient rim member 2, the tire cover being preferably formed of sheet metal, although other materials such as hard rubber, compositions, or the like may be found efficacious. A cushion strip 3 carried by the side plate 2 serves to prevent rattling between the parts 1 and 2. Where the spare wheel and tire are supported independently of a well such as a fender well, it will be appreciated that the outer peripheral portion of the side plate 1 may preferably be uninterrupted circumferentially. Where the spare wheel and tire are mounted in a fender well, if desired, a segmental portion corresponding to the shape of the well may be removed from the side plate so that it will cooperate with the well in substantially entirely concealing the outer side of the spare wheel and tire. The cover is formed cross-sectionally so as to substantially simulate the cross-sectional contour of the tread, front side of the tire and front side of the wheel, as clearly shown in Figure 1.

The side plate 1 at its central opening is formed at 4 so as to present a curved surface for camming the spring latches L of the cap H to enable the same to be readily interlocked with the cover member 1 as shown. This central portion of the cover member 1 is provided with a plurality of spaced lips or ears 5, of which four are shown for illustrative purposes only. Any number of lips is susceptible of use, so long as the desired result is accomplished. The said lips or ears 5 are bent or wrapped about corresponding arcuate portions 6 of a spring ring 7 provided intermediate the ears 5 with substantially U-shaped fingers 8 extending in the general direction parallel to the axis of the cover member 1.

The arms 9 of each finger 8 extend directly from the anchored portions 6 so as to provide clearance for the collar of the hub cap H and are bent inwardly at 10 to such an extent as to fit in the hub opening G without interfering with the engagement of the outer peripheral portion of the plate 1 with the tire A. The arms 9 continue rearwardly from the shoulders 10 to provide outer bearing surfaces for the mouth G of the hub C, and terminate rearwardly in a bight 11 which is bent inwardly so that its rearmost portion is at somewhat less radius, while its foremost portion is at somewhat greater radius, than the mouth G of the hub C. The fingers 8 are resilient radially, and, starting with the parts arranged as shown in Figure 3, as the cover member 1 is moved rearwardly relative to the wheel B, the bights 11 are cammed inwardly by the front wall K so that the mouth G of the hub engages the outer surfaces of the arms 9 frictionally as the cover member is continued rearwardly until the cover member engages the tire. When the parts are thus arranged as shown in Figure 1, the fingers 8 are held inwardly of their normal positions by the hub wall K, and the fingers thus resiliently press outwardly upon the wall K and hold the cover member 1 in properly centered or coaxial relation with the wheel B, at the same time yieldably resisting removal of the cover member.

With this construction, when it is desired to mount the entire cover structure, it is not necessary first to place the spare wheel and tire in a substantially horizontal plane so as to position the side plate 1, while the rim member 2 is being applied. Instead, the entire wheel and tire structure may be mounted on a suitable support such as the carrier F and the side member 1 mounted on the hub C as previously described and shown in Figure 1. The member 1 may then be left in position without requiring anyone's attention, and thereafter the cover member 2 may be placed in position at leisure. While the pressure exerted by the fingers 8 upon the wall K of the hub C is sufficient to prevent accidental removal of the cover member 1, yet, whenever desired, the side plate member 1 may be grasped at any convenient part thereof, as for example the center or outer periphery, and pulled forwardly so as to release the fingers from the hub C.

The inner peripheral portion of the cover member 1 is formed as shown at 12 between the ears 5 so as to enable the latches L of the hub H to be snapped over the same when the the hub cap is mounted on the cover member, and to serve as anchoring means or retaining means to hold the hub cap in assembled relation with the tire cover member 1. The hub cap H may be released from the cover member 1 in substantially the usual way in which it is released from the hub C.

A modified form of centering means is shown in Figures 4, 5, and 6, in conjunction with a modified tire cover structure, although it will be understood that the centering means could be employed for example with the side plate structure 1 of Figures 1, 2 and 3. The cover member 13 of Figures 4, 5 and 6 is of the substantially one-piece type embodying a drum-like side plate for concealing the front side of the hub as well as the remainder of the spare wheel B and the front side of the tire A, and has a rim portion for overlying the thread of the tire.

The centering means of this form of the invention takes the shape of a spider having substantially angular duplex arms 14 extending substantially radially from the center of the cover 13 and then bent and extending rearwardly and somewhat radially outwardly so as to be inclined and diverge rearwardly from one another. Each arm 14 is thus generally U-shaped, the bight 15 thereof converging with the bights of the other arms 14 so as to provide cam surfaces for engaging with the front wall K of the hub C at the mouth G thereof. The inner part of each bight 15 is disposed radially inwardly and the outer portion of each bight is disposed radially outwardly of the mouth G. The major portions of the diverging parts 16 of the arms 14 have their outermost surfaces disposed radially outwardly of the mouth G. When the cover 13 is being applied, the same is arranged in substantially coaxial relation with the hub C. This can readily be determined by locating the rim of the cover so that it is adjacent the front margin of the tire tread. As the cover 13 is moved rearwardly toward the spare wheel and tire, any slight eccentricity of the tire with respect to the wheel, which is likely to happen because of the clearance between the free edge 17 of the cover and the tire tread, will be compensated for by the turned in bights 15, which will serve to guide and cam the cover by virtue of engagement with the wall K of the hub C, into substantially coaxial relation to the spare wheel and tire, the arms 14 being forced to yield inwardly until the bights 15 are clear of the mouth G. Then, as the cover 13 is continued in its telescoping movement with respect to the spare wheel hub C, the mouth G rides over the diverging portions 16 of the arms 14, until the outer part of the cover engages the front wall of the tire A as at 18, when said portions 16 will occupy positions somewhat inwardly of those occupied thereby when the same are unstressed as shown in Figure 6. Due to the constant tendency of the parts 16 to move outwardly, they exert pressure on the mouth G of the hub C and thus yieldably resist removal of the cover. When it is desired to remove the cover, it is necessary merely to grasp the same at its outer edge 17 or at any other suitable part or parts so as to exert a forward pull on the cover to draw the arms 14 forwardly out of engagement with the hub C.

As in the above described form of the invention, the arms 14 operate to prevent rattling and at the same time properly center the cover relative to the spare wheel and tire.

While four arms are shown in the form of the invention illustrated in Figures 4, 5 and 6, it is to be understood that any other desired number of arms may be employed so long as they accomplish the result described. This is also true of the form of the invention appearing in Figures 1, 2 and 3.

The spider structure of Figures 4, 5 and 6 may be secured to the cover member 13 in any suitable manner. One means for so doing is illustrated, and embodies a plate 19 which is stamped or otherwise formed with grooved portions 20 to receive the inner ends of the arms 14. The cover member 13 and plate 19 are provided centrally with registering holes through which an attaching member such as the screw 21 passes, a lock washer being associated therewith to prevent retraction thereof. For the purpose of ornamentation, a suitable medallion, nameplate, knob, or the like, as shown at 22, may be threaded about the projecting end of the screw 21. It will be appreciated that if desired the parts could be spot welded, riveted or connected in any other suitable manner. The connection is, however, preferably tight so that no rattling may occur.

A construction somewhat modified over that of Figures 4, 5 and 6 is shown in Figures 7 and 8. This modified construction may be applied to the cover 13a, which may be in one piece, or if desired, may constitute merely a side plate of multi-part structure such as shown in Figure 1. In Figures 7 and 8, the centering structure is of wire and includes an X-shaped element whose arms, radiating substantially from the center thereof, are bent at substantially right angles. Each pair of arms of the X-shaped figure is connected at the ends of the bent portions thereof, and the central parts of the X-shaped figure are spaced apart to provide thereby a substantially closed figure. The radiating portions of the element are arranged to engage the inner, preferably curved surface of the cover member 13a as shown at 23, the spaced central portions thereof being sandwiched between the retaining plate 24 and the cover member 13a. The retainer plate 24 is provided with grooved portions 25 to receive said central portions 26 of the X-like structure, and a securing device such as a screw 27 passes through the plate 24 and cover 13a, the axis of the cover receiving on its projecting end a medallion, nameplate, knob, or the like 28. A lock washer associated with the screw 27 serves to prevent retraction of the screw and thus the parts are held in properly assembled relation against rattling. Obviously, if desired, the plate 24 and cover 13 could be connected as by spot welding, riveting or the like.

Each pair of arms 23 as stated projects rearwardly at 29. The portions 29 are arranged at a substantially greater radius than the mouth G of the hub C. Each pair of arms 23 at the rear of the portions 29 thereof has an inwardly turned bight portion 30 arranged so as to provide cam surfaces 30a, engageable with the mouth G of the hub C so that as the cover member 13a is moved rearwardly with respect to the spare wheel B, the bight 30 is forced radially inwardly by the mouth G of the front wall K of the hub C, the telescoping movement of course terminating upon engagement of the cover 13a with the front wall of the spare tire A. The portions 29 are normally radially outwardly of the mouth G so that the same are resiliently engaged by the hub and thus cooperate in substantially the same manner in which the centering means of the previously described forms of the invention cooperate.

A further modified centering structure is shown in Figures 9 and 10, wherein the wire structure 31 is provided with diametrically opposed arcuate portions 32 disposed substantially in the same plane for engagement with the inner surface of the cover member 13a. From the ends of the arcuate portions 32, the wire structure 31 projects substantially at right angles to the portions 32 and rearwardly of the cover 13 as shown at 33, and are then bent inwardly at 34. The portions 34 provide cams engageable with the mouth G of the hub C so as to be cammed inwardly as the cover is shoved rearwardly into proper protecting relation to the spare wheel and tire, the extent to which the portions 33 project into the hub C being determined by the engagement of the outer peripheral part of the cover 13a with the spare tire. When the parts are assembled as shown in Figure 10, the portions 33 press outwardly upon the wall K of the hub C at the mouth G thereof, and thus center the cover and at the same time yieldably resist accidental removal of the cover. The portions 34 of each arcuate portion 32 are connected by substantially parallel members 35 to the adjacent portions 34 of the opposite arcuate part 32.

The centering structure 31 is held in substantially coaxial relation to the cover 13a by means of a retaining strap or plate 36 provided with grooved portions 37 in which the arcuate portions 32 of the structure 31 are received. The plate 36 is secured to the cover 13a by means of a screw 38 passing axially through the cover member 13, a medallion, knob or nameplate 39 being preferably mounted on the projecting end of the screw. To prevent retraction of the screw 38, a lock washer may be employed as shown.

A still further modified form of the invention appears in Figures 11 and 12. This modification is somewhat similar to that shown in Figures 4, 5 and 6, except that instead of employing a substantially continuous wire to form the spider structure, in Figures 11 and 12 there is employed a pair of separate integral members arranged in the form of a cross, each member providing two arms of the spider. One of the members is shown at 40 to be provided with kinks 41, the corresponding portions 42 of the other member 43 being straight so as to pass under and fit in the kinks 41.

Each of the members 40 and 43 away from the central portions thereof are formed substantially identical to each other, each providing oppositely disposed substantially U-shaped rearwardly extending parts 44 arranged to yieldably engage the mouth G of the hub C so as to center the cover and prevent accidental removal of the cover. The part 44 is also provided with an inwardly turned bight 45 providing a cam for assisting in projection of the centering means within the hub C.

To hold the members 40 and 43 in properly assembled relation with each other, a retainer plate 46, grooved to receive the straight portions 42 and kinked portions 41, is secured on the rear side of the cover 13a by means of a screw 47 projecting axially forwardly through the cover member 13a and carrying on its projecting end a medallion, nameplate, knob or the like 48, a lock washer preferably being employed in conjunction with the screw 47 to prevent retraction thereof and hold the parts in assembled relation against rattling. It will be understood that any other suitable means such as spot welding, riveting or the like could be employed in place of the screw 47 and associated instrumentalities to hold the parts together.

Figure 13 is a view which illustrates how the centering structure of Figures 1, 2 and 3 would be positioned in relation to the hub 49 of a wire wheel of a size larger than that shown in Figures 1, 2 and 3. Or, in the event the wheel of Figures 1, 2 and 3 is employed in conjunction with a tire of greater width than that shown, the cover side plate will engage the tire somewhat farther from the median plane of the tire so that the hub will be positioned somewhat rearwardly of that shown with respect to the centering means.

Figure 14 shows the same centering means appearing in Figure 13, in relation to the hub 50 of a disc or artillery type of wheel of substantially the same size as the wire wheel shown in Figure 1. In the event a wheel of the artillery type of larger size than that shown at 50 is employed in connection with the same centering means, the hub of such wheel would appear farther to the rear of the cover as at 51, and it is obvious that the hub 50 would be positioned rearwardly of the position shown in Figure 14 in the event a larger size tire were carried thereby.

While in the various modifications illustrated wire is employed to form the centering means, it is to be understood that sheet or other material is capable of being used instead of wire. Wire is, however, preferred because it is cheap and easy to form in desired shapes without requiring machining or other expensive manufacturing operations.

The plates of the various forms shown for retaining the various forms of centering means are preferably of sheet metal, although other suitable material may be employed without departing from the spirit of the invention.

Each of the wire elements herein described may have its ends connected as by welding, or said ends may be separate if desired.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In combination with a spare wheel and tire assembly, a disc shaped to cover the front side of the wheel and tire and having a substantially central opening of substantially the same size as that of the wheel hub so as to accommodate the same hub cap, resilient centering means arranged substantially centrally of the disc and having anchoring means, and means associated with said disc for securing said anchoring means thereto, said resilient means projecting rearwardly from the disc for engaging in the wheel hub so as to center the disc relative to the spare wheel and tire.

2. In combination with a spare wheel and tire assembly, a disc shaped to cover the front side of the wheel and tire and having a substantially central opening of substantially the same size as that of the wheel hub so as to accommodate the same hub cap, resilient centering means arranged substantially centrally of the disc, and means associated with said disc and resilient means for anchoring said resilient means to the disc, said resilient means projecting rearwardly from the disc for engaging in the wheel hub so as to center the disc relative to the spare wheel and tire, said resilient means being formed so as to provide clearance for a hub cap collar so that a hub cap may be mounted in said disc.

3. In combination with a spare wheel and tire assembly, a disc shaped to cover the front side of the wheel and tire and having a substantially central opening of substantially the same size as that of the wheel hub so as to accommodate the same hub cap, resilient centering means arranged substantially centrally of the disc, and means associated with said disc and resilient means for anchoring said resilient means to the disc, said resilient means projecting rearwardly from the disc for engaging in the wheel hub so as to center the disc relative to the spare wheel and tire, said resilient means comprising a substantially continuous ring-like member having substantially U-shaped fingers for cooperating with the wheel hub.

4. In combination with a spare wheel and tire assembly, a disc shaped to cover the front side of the wheel and tire and having a substantially central opening of substantially the same size as that of the wheel hub so as to accommodate the same hub cap, resilient centering means arranged substantially centrally of the disc, and means associated with said disc and resilient means for anchoring said resilient means to the disc, said resilient means projecting rearwardly from the disc for engaging in the wheel hub so as to center the disc relative to the spare wheel and tire, said resilient means comprising a substantially continuous ring-like member having substantially U-shaped fingers for cooperating with the wheel hub, the bights of said fingers being converged relative to one another to provide cam surfaces for enabling the hub to flex said fingers inwardly as they are forced into the hub.

5. In combination with a spare wheel and tire assembly, a disc shaped to cover the front side of the wheel and tire, resilient centering means arranged coaxially of the disc and having anchoring means, and means securing said anchoring means to the disc so as to arrange said resilient means in substantially central relation to the disc, said resilient means projecting rearwardly from the disc and different portions of the resilient means being selectively engageable in the wheel hub so as to center the disc relative to the spare wheel and tire and enable the disc to accommodate tires of different widths.

6. In a spare-wheel, tire and cover assembly, a drum-like plate formed to cover the entire outer side of the spare wheel, and means disposed on the rear side of the plate for cooperating with the wheel hub in supporting and centering the plate, said means comprising a spider whose arms include rearwardly extending spring portions arranged to be flexed inwardly by the wheel hub as the plate is moved rearwardly in substantially central relation to the wheel, and thereafter frictionally engage the hub whereby to hold the plate in said relation.

7. In a spare wheel, tire and cover assembly, a drum-like plate formed to cover the entire outer side of the spare wheel, and means disposed on the rear side of the plate for cooperating with the wheel hub in supporting and centering the plate, said means comprising a spider whose arms include spring portions arranged to be flexed inwardly by the wheel hub as the plate is moved rearwardly in substantially central relation to the wheel, and to thereafter resiliently engage the hub and hold the plate in said relation, and means arranged substantially centrally of the spider for securing the same coaxially with said plate.

8. In a spare wheel, tire and cover assembly, a drum-like plate formed to cover the entire outer side of the spare wheel, and means disposed on the rear side of the plate for cooperating with the wheel hub in supporting and centering the plate, said means comprising a spider whose arms include spring portions arranged to be flexed inwardly by the wheel hub as the plate is moved rearwardly in substantially central relation to the wheel, and to thereafter resiliently engage the hub and hold the plate in said relation, means arranged substantially centrally of the spider for securing the same coaxially with said plate, and ornamental means for shielding said securing means from the front of the plate.

9. In a spare wheel, tire and cover assembly, a drum-like plate formed to cover the entire outer side of the spare wheel, means disposed on the rear side of the plate for cooperating with the wheel hub in supporting and centering the plate, said means comprising a spider whose arms include spring portions arranged to be flexed inwardly by the wheel hub as the plate is moved rearwardly in substantially central relation to the wheel, and to thereafter resiliently engage the hub and hold the plate in said relation, and means arranged substantially centrally of the spider for securing the same coaxially with said plate, said securing means including a retainer plate recessed to receive and anchor said arms.

10. In combination with a spare wheel and tire assembly, a disc shaped to cover the front side of the wheel and tire, resilient means arranged coaxially of the disc and having anchoring means, means securing said anchoring means to the disc so as to arrange said resilient means in substantially central relation to the disc, said resilient means projecting rearwardly from the disc for engaging in the wheel hub so as to center the disc relative to the spare wheel and tire, and ornamental means for shielding the securing means from the front of the disc.

11. In combination with a spare wheel and tire assembly, a disc shaped to cover the front side of the wheel and tire, resilient means arranged coaxially of the disc and having anchoring means, and means for securing said anchoring means so as to arrange said resilient means in substantially central relation to the disc, said resilient means projecting rearwardly from the disc for engaging in the wheel hub so as to center the disc relative to the spare wheel and tire, said resilient means comprising a spider whose arms adjacent the body thereof are arranged in substantial parallelism to the disc at the central part thereof so as to lie against the same, said securing means including a plate provided with grooves to receive said arms to hold them in substantially fixed relation to one another.

12. In combination with a spare wheel and tire assembly, a disc shaped to cover the front side of the wheel and tire, resilient means arranged coaxially of the disc and having anchoring means, and means for securing said anchoring means so as to arrange said resilient means in substantially central relation to the disc, said resilient means projecting rearwardly from the disc for engaging in the wheel hub so as to center the disc relative to the spare wheel and tire, said resilient means comprising a spider whose arms adjacent the body thereof are arranged in substantial parallelism to the disc at the central part thereof so as to lie against the same, said securing means including a plate provided with grooves to receive said arms to hold them in substantially fixed relation to one another, said arms being arranged in joined pairs bent rearwardly for engaging with the wheel hub for the purpose described.

13. In a spare wheel, tire and cover assembly, a drum-like plate formed to cover the entire outer side of the spare wheel, and means disposed on the rear side of the plate for cooperating with the wheel hub in supporting and centering the plate, said means comprising a spider whose arms include spring portions arranged to be flexed inwardly by the wheel hub as the plate is moved rearwardly in substantially central relation to the wheel, and to thereafter resiliently engage the hub and hold the plate in said relation, said spider comprising a continuous spring wire formed in a skeleton cup shape.

14. In a spare wheel, tire and cover assembly, a drum-like plate formed to cover the entire outer side of the spare wheel, and means disposed on the rear side of the plate for cooperating with the wheel hub in supporting and centering the plate, said means comprising a spider whose arms include spring portions arranged to be flexed inwardly by the wheel hub as the plate is moved rearwardly in substantially central relation to the wheel, and to thereafter resiliently engage the hub and hold the plate in said relation, said spider comprising crossed members each of which is substantially U-shaped to provide said arms.

15. A spare tire cover for use in connection with a spare wheel including a tire rim connected to an apertured wheel hub and fastening means for the wheel to support the wheel on a vehicle and accessible through said wheel hub, the spare tire cover including a side disc like portion for disposition over the outer side wall of the tire and over the wheel and having an opening at its center in alignment with the aperture in the wheel hub, a removable hub cap disposed in said opening for closing the same, and a resilient fitting attached to said disc like portion about said opening and adapted to project into resilient engagement with the wheel hub for the purpose of centering the cover on the wheel and tire.

16. In a spare wheel assembly, a spare wheel including a rim and a hollow hub and a spare tire cover for cooperation with said spare wheel and the tire thereon, including a side drum portion with a central portion thereof removed, providing an opening in alignment with the opening in the wheel hub for removably receiving a hub cap and a resilient fitting secured to said side drum portion and projecting inwardly from the same so as to extend into the wheel hub for the purpose of centering the tire cover on the wheel and tire.

17. In combination with a spare wheel and tire assembly, a disc shaped to cover the front side of the wheel and tire, said disc being provided with resilient centering means projecting rearwardly from the disc and different portions of said means being selectively engageable in the wheel hub so as to center the disc relative to the spare wheel and tire and enable the disc to accommodate tires of different widths.

18. In a spare wheel, tire and cover assembly, a drum-like plate formed to cover the entire side of the spare wheel, said plate being provided with means disposed on the rear side of the plate for cooperating with the wheel hub in supporting and centering the plate, said means comprising a spider whose arms include spring portions arranged to be flexed inwardly by the wheel hub as the plate is moved rearwardly in substantially central relation to the wheel, and to thereafter resiliently engage the hub and hold the plate in said relation, said spider including a body recessed to receive and anchor said arms.

19. In combination with a spare wheel and tire assembly, a disc shaped to cover the front side of the wheel and tire, resilient centering arms associated with said disc, and means for securing said arms in substantially central relation to the disc, said arms projecting rearwardly from the disc for engaging in the wheel hub so as to center the disc relative to the spare wheel and tire, said securing means including a recessed plate receiving the forward portions of said arms and holding them in substantially fixed relation to one another.

20. In combination with a spare wheel and tire assembly, a disc shaped to cover the front side of the wheel and tire, resilient centering arms associated with said disc, and means for securing said arms in substantially central relation to the disc, said arms projecting rearwardly from the disc for engaging in the wheel hub so as to center the disc relative to the spare wheel and tire, said securing means including a recessed plate receiving the forward portions of said arms and holding them in substantially fixed relation to one another, said arms being arranged in joined pairs bent rearwardly for engaging with the wheel hub for the purpose described.

ARTHUR P. FERGUESON.